United States Patent Office 3,641,120
Patented Feb. 8, 1972

3,641,120
PROCESS FOR THE PRODUCTION OF
LONG CHAIN ESTERS
Edward J. Broderick, Edison, and Burton M. Rein, East
Brunswick, N.J., assignors to Mobil Oil Corporation
No Drawing. Filed Sept. 14, 1970, Ser. No. 72,228
Int. Cl. C07c 67/00
U.S. Cl. 260—491                           8 Claims

ABSTRACT OF THE DISCLOSURE

This specification discloses a process for the production of long chain esters. In this process, an ester of an acid having at least two carbon atoms and at least one hydrogen atom on the alpha carbon atom of the acid moiety is reacted with an olefin. This reaction is carried out in the presence, along with a manganic carboxylic acid salt or oxide, a zirconyl carboxylic acid salt or zirconium oxide.

CROSS REFERENCE TO RELATED APPLICATIONS

The reaction of an ester having at least two carbon atoms with an olefin in the presence of a manganic carboxylic acid salt is disclosed in the copending application of El Ahmadi I. Heiba and Ralph M. Dessau, entitled "Selective Reactions of Free Radicals with Unsaturated Compounds," Ser. No. 755,732, filed Aug. 27, 1968.

BACKGROUND OF THE INVENTION

Field of the invention

This invention relates to the production of long chain esters and relates to the production of such esters by reacting a shorter chain ester with an olefin.

Description of the prior art

The production of long chain esters by reaction of a short chain ester with an olefin in the presence of a manganic carboxylic acid salt is known, as exemplified by the aforementioned copending application Ser. No. 755,-732.

SUMMARY OF THE INVENTION

In accordance with the invention, in the production of long chain esters by reaction of a shorter chain ester of an acid having at least two carbon atoms and at least one hydrogen atom on the alpha carbon atom of the acid moiety with an olefin in the presence of a manganic carboxylic acid salt or oxide, the reaction is carried out in the presence of a zirconyl carboxylic acid salt or zirconium oxide.

DESCRIPTION OF THE PREFERRED EMBODIMENT

In the practice of the invention, any ester having at least two carbon atoms and at least one hydrogen atom on the alpha carbon atom can be employed. These esters can be represented by the formula:

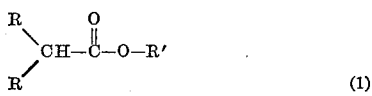

(1)

The reaction of an ester with an olefin in the presence of a manganic carboxylic acid salt or oxide involves the telomerization of the olefin with the ester. In the telomerization reaction, as a first step, the ester reacts with the manganic compound to produce a free radical. This free radical is produced as a result of removing a hydrogen atom from the alpha carbon atom of the acid moiety of the ester. The hydrogen atom combines with the manganic compound to produce the corresponding manganous compound and to produce carboxylic acid or water, depending upon whether a salt or oxide is employed. The free radical then combines with the olefin to form another free radical and the reaction continues with addition of olefin to the free radical until stoppage of chain growth occurs. Hence, in the reaction of an ester with an olefin, the ester employed requires a hydrogen atom on the alpha carbon atom.

Esters, with long chain alkoxy groups, can also be obtained in the telomerization reaction. Thus, by a chain transfer mechanism, a free radical can abstract a hydrogen atom from the alkoxy moiety of an ester molecule. In this manner a new free radical is produced from the ester molecule and can add to the olefin to form another free radical. The latter radical continues to add olefin until stoppage occurs. The final product is an ester composed of the original acid and a new long chain alcohol.

In Formula 1 above, R can be hydrogen or can be a hydrocarbyl group or an organyl group, and either R can be the same as or different from the other R. The term "hydrocarbyl" designates any group containing only carbon and hydrogen, such as alkyl, alkenyl, alkynyl, aryl, alkaryl, and aralkyl. The term "organyl" designates hydrocarbyl groups and groups containing atoms other than carbon and hydrogen. These latter groups include acyl, acyloxy, alkoxy, aldehyde, mercapto, amide, aryloxy, aroyl, aroyloxy, arylmercapto, aralkylmercapto, alkarylmercapto, carboxy, cyano, and nitro groups and groups containing a halogen such as chlorine, bromine, or fluorine. R may be aliphatic or may be cyclic. Further, in the formula, R' can be a hydrocarbyl group or an organyl group. R' cannot be hydrogen. Otherwise, R' can be the same or different from R. Suitable esters are methyl acetate, methyl propionate, and ethyl butyrate. Other esters which may be employed include alkyl esters of phenylacetic, phenylpropionic, and coumaric acids. Preferably, methyl acetate is employed.

The olefin employed in the practice of the invention will have the formula:

(2)

In Formula 2, R'' can be any of the groups that R, in Formula I above, can be. Thus, R'' can be hydrogen, a hydrocarbyl group or an organyl group. Further, any one R'' in Formula 2 may be the same as or different from any other R''. It will be seen that the olefin of Formula 2 contains two or more carbon atoms. Suitable olefins include ethylene, propylene, the butenes, pentenes, hexenes, heptenes, octenes, nonenes, undecenes, dodecenes, tetradecenes, pentadecenes, hexadecenes, octadecenes, eicosenes, hexacosenes, and triacontenes. The olefins employed may be straight or branched chain, although it is to be noted that the yield of long chain esters is less where branched chain olefins are employed as compared with straight chain olefins. Also suitable are open chain, conjugated diolefins having 3 to 20 or 30 or more carbon atoms and including allene, butadiene, isoprene, pentadiene, hexadiene, heptadiene, diisobutenyl, decadiene, and the like and substituted diolefins like 2-cyanobutadiene, and chloroprene. Also of use are open chain, conjugated olefins having more than two double bonds, sometimes designated oligo-olefins, such as hexatriene and 2,6-dimethyl-2,4,6-octatriene. By "conjugated" is meant that the two pairs of carbon atoms joined by double bonds do not share a common carbon atom. Cyclic olefins are also suitable, such as cyclopentene, cyclohexene, cycloheptene, cyclooctene, and terpenes such as the various menthenes, thujenes, carenes, pinenes, and bornylenes and cyclic diolefins and cyclic oligo-olefins such as cyclobutadiene, cyclopentadiene, fulvene, norbornadiene, cyclooctadiene, 4-vinylcyclohexene, limonene, dipentene, dicyclopentadiene, cycloheptatriene, cyclooctatriene, bicyclo(2.2.2.) octa-2,5,7-triene, cyclonona-1,4,7-triene, and cyclooctatetraene. Mixtures of olefins may also be employed.

Manganic carboxylic acid salts and oxides and zirconyl carboxylic acid salts and zirconium oxide are substantially insoluble in the esters and olefins employed in the process of the invention and the reaction products obtained. Thus, the process of the invention is carried out with the manganic carboxylic acid salt or oxide and the zirconyl carboxylic salt or zirconium oxide in the solid phase.

The process of the invention may be carried out employing two or more manganic compounds and two or more zirconyl compounds. Thus, two or more manganic carboxylic acid salts or two or more manganic oxides may be employed or one or more manganic carboxylic acid salts and one or more manganic oxides may be employed. Similarly two or more zirconyl carboxylic acid salts or one or more zirconyl carboxylic acid salts and zirconyl oxide may be employed.

In the reaction between the ester and the olefin, the manganic carboxylic acid salt or oxide, as mentioned previously, reacts with the ester to remove a hydrogen atom from the alpha carbon atom of the acid moiety of the ester to form a free radical, and the manganic compound is reduced to the corresponding manganous compound. Thus, the manganic carboxylic acid salt or oxide is an initiator for the reaction.

Manganic acetate is a preferred manganic carboxylic acid. Manganic acetate dihydrate is a preferred manganic acetate and it may be formed by oxidizing an acetic acid solution of manganous acetate with potassium permanganate. Other suitable manganic acetate source compounds or mixtures include anhydrous manganic acetate, a mixture of activated (i.e., freshly prepared or acid treated) manganese dioxide and acetic acid, a mixture of manganese sesquioxide and acetic acid, and a mixture of mangano-manganic oxide and acetic acid.

Other higher-valent manganese ions can be used for preparing the manganic carboxylic acid salt. Thus, $Mn^{+4}$, as obtained from a mixture of $MnO_2$ and acetic acid, $Mn^{+6}$, as supplied by the manganate of sodium, potassium, ammonium, lithium, magnesium, strontium, or barium, and $Mn^{+7}$, as supplied by the permanganate of sodium, ammonium, potassium or magnesium may be used. In addition to the foregoing higher-valent manganese ions, it is feasible to employ mixtures of ions, such as $Mn^{+2}$ plus any of $Mn^{+3}$, $Mn^{+4}$, $Mn^{+6}$, or $Mn^{+7}$; $Mn^{+3}$ plus any of $Mn^{+4}$, $Mn^{+6}$ or $Mn^{+7}$; or $Mn^{+4}$ plus $Mn^{+6}$ or $Mn^{+7}$; or $Mn^{+6}$ plus $Mn^{+7}$. Such mixtures may be supplied by suitable mixtures of the foregoing source compounds. The $Mn^{+2}$ ion may be supplied by manganous acetate.

Regardless of the method of preparing the manganic carboxylic acid salt, the salt, if soluble in the reaction mixture in which it is prepared, is separated from the reaction mixture to obtain the salt in the solid phase. For example, the reaction mixture in which the salt is prepared may be subjected to evaporation to remove therefrom any material effecting solution of the salt. Thus, where acetic acid is employed in the preparation of the salt and in which the salt is soluble, the acetic acid may be removed from the reaction mixture by evaporation.

Along with the manganic carboxylic acid salt or oxide, there is employed in the reaction mixture a zirconyl carboxylic acid salt or oxide. The zirconyl compound provides a synergistic effect in cooperation with the manganic compound to increase the yield of long chain esters over the yield obtained by the use of the manganic compound alone. The manganic compound, as indicated above, enters into the reaction which provides the free radical by removal of a hydrogen atom from the alpha carbon atom of the starting ester. Accordingly, the manganic compound cannot strictly be regarded as a catalyst. On the other hand, the zirconyl compound acts truly as a catalyst in cooperation with the manganic compound, the zirconyl compound remaining unchanged throughout the reaction, and thus, to the extent that the manganic compound may be regarded as a catalyst, the zirconyl compound acts as a co-catalyst.

The zirconyl carboxylic acid salt has the formula:

$$O=Zr(O-\overset{O}{\underset{\|}{C}}-R)_2 \qquad (3)$$

In Formula 3, R can be any of the radicals that R in Formula 1 can be. Zirconyl acetate is the preferred zirconyl carboxylic acid salt. Other specific zirconyl carboxylic acid salts are zirconyl propionate, butyrate, hexanoate and laurate.

Various types of long chain esters may be produced by the process of the invention. For example, methyl butyrate, methyl hexanoate, pentyl acetate, methyl 2-ethyl hexanoate, methyl decanoate, methyl dodecanoate, methyl octadecanoate, methyl 2-butyl hexanoate, and heptyl acetate. Various of these esters find use as solvents, plasticizers, perfumes, flavors, and medicinals. The esters can be converted to fatty acids various of which have commercial application in oil additives, foods, soaps, and catalysts.

Considering now the conduct of the reaction, the concentration of the olefin may range from 0.01 to 3 moles, preferably 0.25 to 1 mole, per mole of manganic compound. The short chain ester is preferably present as the reaction solvent and generally is tenfold greater in concentration than the olefin. The reaction may be performed by refluxing the reactants, although lower temperatures may be used ranging from about 40° to 100° C. Temperatures above boiling are of use but in this case the reaction is performed under pressure to maintain a liquid phase. With volatile olefins, e.g. ethylene, the reaction can be performed in suitable pressure apparatus. Reaction times generally extend from an hour or less to 5 or 10 hours or more. An inert atmosphere, such as one of nitrogen, carbon dioxide, helium and the like is desirably maintained over the reaction mixture to lessen or avoid oxidation by air.

The manganic compound is employed in the reaction mixture in the amount of at least 0.005 mole per mole of short chain ester. Greater amounts may be employed. For example, the amount of manganic compound may be 0.50 mole per mole of short chain ester. Preferably, the amount of manganic compound employed is between 0.01 and 0.25 mole per mole of short chain ester.

The zirconyl compound is employed in the reaction mixture in the amount of at least 0.05 mole per mole of manganic compound. Amounts of zirconyl compound as great as 1 mole per mole of manganic compound may also be employed. Preferably, the amount of zirconyl compound employed is between 0.10 and 0.50 mole per mole of manganic compound.

At the conclusion of the reaction, separation of the product may be effected as by conventional distillation, extraction, fractional crystallization, and the like with or without the aid of conventional filtration or centrifugation. For example, the mixture may be filtered to remove the solid manganic and zirconyl compounds and then subjected to distillation, using vacuum if necessary to separate the long chain ester product from other components of the reaction mixture.

The following examples will be illustrative of the invention.

EXAMPLE 1

This example illustrates the yield of long chain esters obtained when reacting methyl acetate with ethylene in the presence of manganic acetate alone.

A one liter stirred autoclave was charged with 464.5 grams (6.27 moles) of methyl acetate and 20 grams (0.075 mole) of manganic acetate. Ethylene was added to give a pressure of 200 pounds per square inch gage (p.s.i.g.). The reaction mixture was then heated to 190° C. At this point more ethylene was added to give a total pressure of 950 p.s.i.g. The pressure was maintained between 900–950 p.s.i.g. by adding fresh ethylene when needed. After 4 hours at temperature the autoclave was cooled and vented. Upon distillation of the reaction mixture, there remained 12 grams of ester products.

EXAMPLE 2

This example illustrates the yield of long chain esters obtained when reacting methyl acetate with ethylene in the presence of zirconyl acetate alone.

The procedure of Example 1 was repeated except that in place of the manganic acid 20 grams (0.089 mole) of zirconyl acetate were employed and the reaction was carried out for 5 hours. The yield of long chain esters was negligible.

EXAMPLE 3

This example illustrates the yield of long chain esters obtained when reacting methyl acetate with ethylene in the presence of both manganic acid and zirconyl acetate.

The procedure of Example 1 was repeated except that the reaction was carried out in the presence of 18.0 grams (0.067 mole) of manganic acetate dihydrate and 2.0 grams (0.009 mole) of zirconyl acetate and the reaction was carried out for 5 hours. The yield of long chain ester product was 35 grams.

It will be seen from the above examples that the use of the zirconyl compound along with the manganic compound increased the yield of long chain ester products to 35 grams from the 12 grams obtained by the use of the manganic compound alone. This is an increase of 290% in the yield of the long chain ester products. It is appreciated that the reaction time when employing the manganic compound and the zirconyl compound was 5 hours as compared with 4 hours when employing the manganic compound alone. However, this increase in reaction time of 25% could not be expected to explain the almost three-fold increase in the yield of the long chain ester product obtained when employing the zirconyl compound along with the manganic compound.

We claim:

1. In a process for the production of long chain esters comprising reacting an ester of an acid having at least two carbon atoms and at least one hydrogen atom on the alpha carbon atom of the acid moiety of the ester, said ester having the formula:

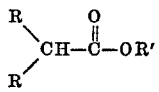

wherein R is hydrogen or a hydrocarbyl group and R' is a hydrocarbyl group with an olefin, said olefin having the formula

wherein R″ is hydrogen or a hydrocarbyl group in the presence of a manganic carboxylic acid salt or oxide, the improvement comprising carrying out said reaction in the presence of a zirconyl carboxyl acid salt or zirconium oxide, said zirconyl carboxylic acid salt having the formula:

wherein R is hydrogen or a hydrocarbyl group.

2. The process of claim 1 wherein said ester is methyl acetate.

3. The process of claim 1 wherein said olefin is ethylene.

4. The process of claim 1 wherein said ester is methyl acetate and said olefin is ethylene.

5. The process of claim 1 wherein said zirconyl carboxylic acid salt or zirconium oxide is in the amount of between 0.05 mole and 1 mole per mole of manganic carboxylic acid salt or oxide.

6. The process of claim 1 wherein said zirconyl carboxylic acid salt or zirconium oxide is in the amount of between 0.10 and 0.50 mole per mole of manganic carboxylic acid salt or oxide.

7. The process of claim 1 wherein said manganic carboxylic acid salt is manganic acetate.

8. The process of claim 1 wherein said zirconyl carboxylic acid salt is zirconyl acetate.

References Cited

UNITED STATES PATENTS

| 3,213,149 | 10/1965 | Takahashi et al. | 260—491 |
| 3,282,832 | 11/1966 | Hey et al. | 260—410.9 |
| 3,429,901 | 2/1969 | Blood et al. | 260—410.9 |

JAMES A. PATTEN, Primary Examiner

V. GARNER, Assistant Examiner

U.S. Cl. X.R.

260—399, 404, 408, 410.5, 410.9 N, 410.9 R, 465 C, 465.4, 468 R, 470, 471 R, 476 R, 478, 481 R, 482 R, 483, 484 A, 484 R, 485 R, 486 R, 487, 999

UNITED STATES PATENT OFFICE
CERTIFICATE OF CORRECTION

Patent No. 3,641,120  Dated February 8, 1972

Inventor(s) Edward J. Broderick and Burton M. Rein

It is certified that error appears in the above-identified patent and that said Letters Patent are hereby corrected as shown below:

Column 2, lines 42-45, formula (2) should read:

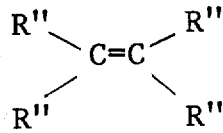

Column 2, line 53, after "nonenes" insert --decenes--.

Column 3 line 10, "and the reaction" should read
--and in the reaction--.

Column 6, line 11, "carboxyl acid" should read
--carboxylic acid--.

Signed and sealed this 13th day of June 1972.

(SEAL)
Attest:

EDWARD M. FLETCHER, JR.  ROBERT GOTTSCHALK
Attesting Officer  Commissioner of Patents